United States Patent
Khair et al.

(10) Patent No.: US 6,467,257 B1
(45) Date of Patent: Oct. 22, 2002

(54) SYSTEM FOR REDUCING THE NITROGEN OXIDE ($NO_x$) AND PARTICULATE MATTER (PM) EMISSIONS FROM INTERNAL COMBUSTION ENGINES

(75) Inventors: Magdi K. Khair; William D. DiSilverio, both of San Antonio; James E. Dittmar, Hondo, all of TX (US)

(73) Assignee: Southwest Research Institute, San Antonio, TX (US)

(*) Notice: Subject to any disclaimer, the term of this patent is extended or adjusted under 35 U.S.C. 154(b) by 0 days.

(21) Appl. No.: 09/884,253

(22) Filed: Jun. 19, 2001

Related U.S. Application Data

(60) Provisional application No. 60/212,606, filed on Jun. 19, 2000.

(51) Int. Cl.[7] ............................................. F02M 25/06
(52) U.S. Cl. .............................. 60/278; 60/301; 60/311; 60/274
(58) Field of Search .......................... 60/274, 278, 280, 60/311, 605.2, 301

(56) References Cited

U.S. PATENT DOCUMENTS

| | | | |
|---|---|---|---|
| 5,085,049 A | | 2/1992 | Rim et al. ................... 60/274 |
| 5,425,239 A | * | 6/1995 | Gobert ...................... 60/605.2 |
| 5,426,936 A | | 6/1995 | Levendis et al. ............. 60/278 |
| 5,440,880 A | * | 8/1995 | Ceynow et al. ............ 60/605.2 |
| 5,711,149 A | | 1/1998 | Araki ......................... 60/278 |
| 5,771,868 A | * | 6/1998 | Khair ........................ 60/605.2 |
| 5,806,308 A | * | 9/1998 | Khair et al. ................ 60/605.2 |
| 5,890,359 A | | 4/1999 | Enander ..................... 60/274 |
| 5,924,280 A | * | 7/1999 | Tarabulski .................. 60/278 |
| 5,927,075 A | * | 7/1999 | Khair ........................ 60/605.2 |
| 5,974,791 A | | 11/1999 | Hirota et al. ................ 60/276 |
| 6,062,026 A | * | 5/2000 | Woollenweber et al. ... 60/605.2 |
| 6,304,815 B1 | * | 10/2001 | Moraal et al. ............... 60/295 |
| 6,311,484 B1 | * | 11/2001 | Roth et al. .................. 60/286 |
| 6,314,722 B1 | * | 11/2001 | Matros et al. ............... 60/286 |

* cited by examiner

Primary Examiner—Thomas Denion
Assistant Examiner—Diem Tran
(74) Attorney, Agent, or Firm—Baker Botts L.L.P.

(57) ABSTRACT

An integrated system for reducing the Nitrogen oxide ($NO_x$) and particulate matter (PM) emissions from an engine released into the atmosphere includes a cooled exhaust gas recirculation system, a selective catalytic reduction system, and a passive diesel particulate filter.

19 Claims, 4 Drawing Sheets

SYSTEM FOR REDUCING THE NITROGEN OXIDE ($NO_x$) AND PARTICULATE MATTER (PM) EMISSIONS FROM INTERNAL COMBUSTION ENGINES

RELATED APPLICATIONS

This application claims the benefit of U.S. Provisional Patent Application Ser. No. 60/212,606 filed Jun. 19, 2000.

TECHNICAL FIELD OF THE INVENTION

The present invention pertains to reducing the transmission of emissions from internal combustion engines to the atmosphere; more particularly, the present invention pertains to reducing both the nitrogen oxide ($NO_x$) and particulate matter (PM) emissions from engines.

BACKGROUND OF THE INVENTION

Diesel internal combustion engines are known for their excellent fuel efficiency and durability. For these two reasons, diesel engines are the preferred power plants for commercial transportation vehicles both in the United States and around the world. Diesel engines have also become popular for use in passenger cars and in light-cargo applications such as pick-up trucks and sport utility vehicles.

The open chamber, direct-injection design internal combustion diesel engine is known for its superior fuel economy and high torque characteristics. However, as with many other fossil fuel burning engines, diesel internal combustion engines have come under increasingly tight exhaust emissions standards, which tight exhaust emissions standards have been mandated by various government administrative agencies.

Specifically, five pollutants in diesel engine exhaust emissions are regulated by government mandated standards: unburned hydrocarbons, carbon monoxide, nitrogen oxide, particulate matter, and smoke.

Modern diesel internal combustion engines of the direct-injection design emit extremely low concentrations of unburned hydrocarbons (HC), carbon monoxide (CO), and smoke. However, the nitrogen oxide ($NO_x$) and particulate matter (PM) emissions still remain a challenge to diesel engine combustion and control engineers. The challenge for diesel engine combustion and control engineers in dealing with $NO_x$ and PM emissions results from the well-studied relationship between these two components of diesel engine exhaust, a relationship known in the diesel engine design and manufacturing industry as the $NO_x$/PM tradeoff. In general, the $NO_x$/PM tradeoff teaches that efforts to reduce $NO_x$ are generally detrimental to PM, and vice-versa.

Recently, three major factors have worked together in concert to provide an incentive to advance the state-of-the-art for controlling the $NO_x$ and PM emissions from diesel engines. These factors are:

The introduction of new emissions standards requiring substantial $NO_x$ reduction without any reduction in PM standards;

The introduction of new engine control technologies using advanced electronic systems;

The introduction of new exhaust after treatment devices having the potential for high $NO_x$ reduction. While diesel engine combustion and control engineers continue to strive to introduce engine design changes to meet ever tighter government mandated emissions standards, it is becoming clear that engine design changes alone may not be sufficient to meet new and projected standards. It is expected by those of ordinary skill in this art area that help in meeting tighter government mandated emissions standards will come from new advanced electronically-controlled engine operation management systems together with novel after treatment for emissions. Despite these expectations, the current state of the art has not yet provided a solution that meets the challenge of regulations on the amount of NO, and PM in diesel engine emissions.

Accordingly, a significant need remains in the art for a system which will reduce both the nitrogen oxide ($NO_x$) and particulate matter (PM) emissions from diesel internal combustion engines released into the atmosphere.

SUMMARY OF THE INVENTION

The system of the present invention reduces both the nitrogen oxide ($NO_x$) and the particulate matter (PM) emissions from a diesel internal combustion engine released into the atmosphere.

The disclosed integrated system for reducing the Nitrogen oxide ($NO_x$) and the particulate matter (PM) emissions from an internal combustion engine released into the atmosphere includes an integration of three technologies that heretofore have never been used together in a single system. Specifically, the disclosed integrated system combines:

i) a cooled exhaust gas recirculation (EGR) system which removes a portion of the exhaust gas flow and recirculates the removed portion of the exhaust gas flow to be inserted into the stream of air taken into the diesel engine;

ii) a selective catalytic reduction (SCR) system placed in connection with the cooled exhaust gas recirculation system described above; and iii) a diesel particulate filter (DPF) for collecting particulate matter placed in series connection downstream from the selective catalytic reduction system.

DETAILED DESCRIPTION

Figure 1:
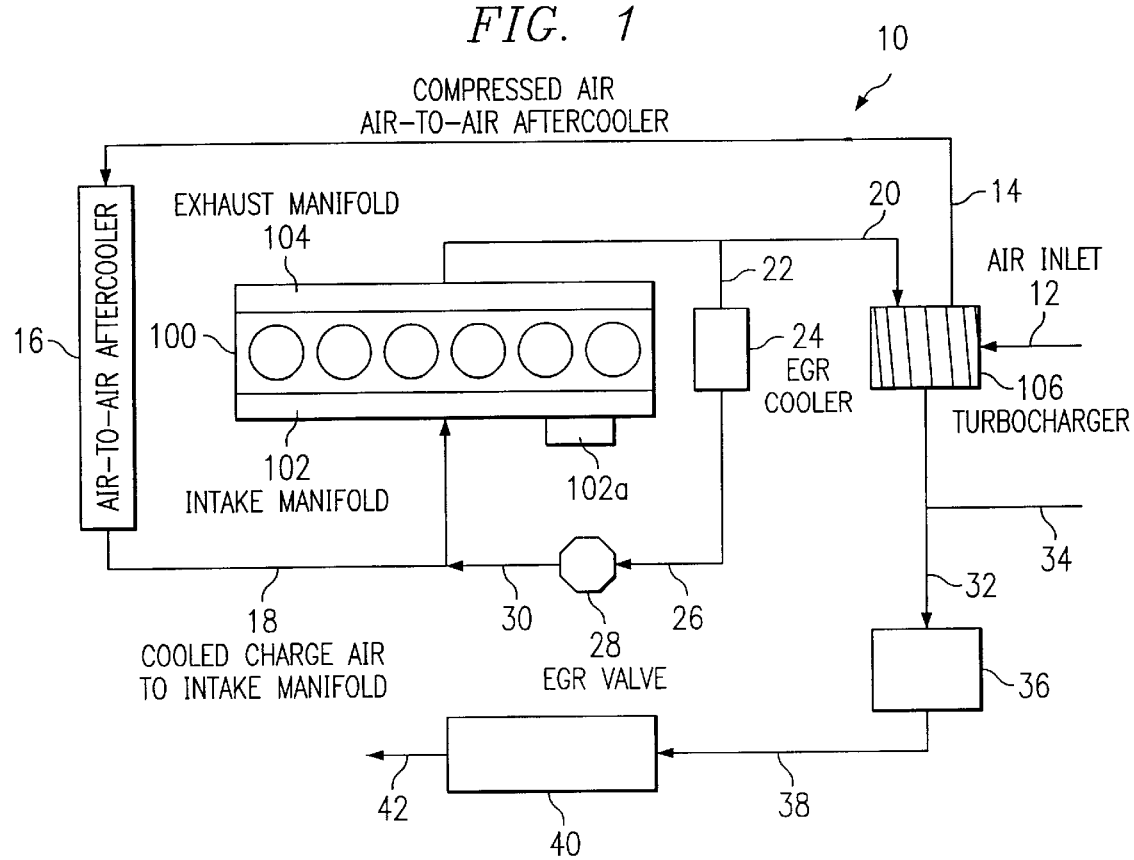
FIG. 1 is a schematic diagram of the integrated system of the present invention.

A better understanding of the integrated system for reducing the Nitrogen oxide ($NO_x$) and particulate matter (PM) in the emissions of diesel internal combustion engines released to the atmosphere, shown in FIG. 1, may be had through a better understanding of the combustion process which takes place in the combustion chamber above the piston in a diesel engine.

Figure 2:
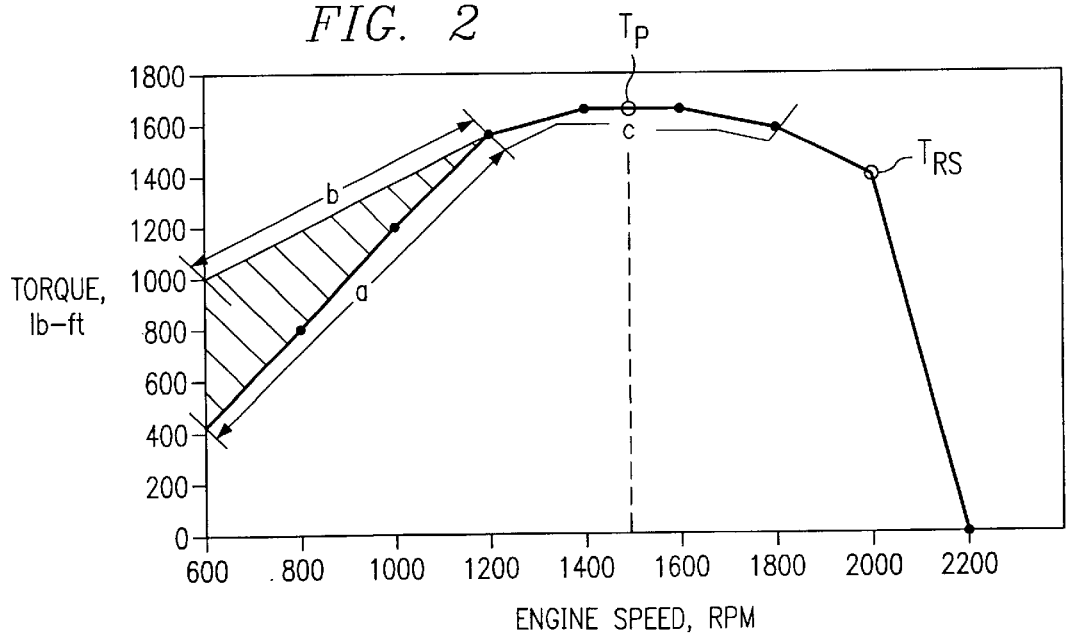
FIG. 2 is a graph of the full-load torque output from a direct injection diesel engine.

In direct-injected (DI) diesel engines, the various components found in the emissions produced by diesel engines differ as the engines operate in different regimes. For example, a DI diesel engine operating at wide-open throttle from low-idle to high-idle speed would produce a torque curve as represented in FIG. 2. The torque output as shown on the y-axis is generally a function of the air which can be taken in by the diesel engine and the fuel that can be combusted by the diesel engine without forming excessive smoke and other particulate matter.

Even though most modern DI diesel engines are turbocharged, the amount of air that can be taken in by the diesel engine at low rpm, especially at or near full-load conditions, is rather limited. This feature usually leads diesel engine combustion and control engineers to limit fueling at low speed and full-load condition. Limiting fueling at low speeds and full load conditions is represented in FIG. 2 by line segment "a" on the full load-torque output line. If the fuel system were to inject additional fuel into the diesel engine at its full operational capacity, without regard to the production of smoke at a low rpm operating condition, a higher torque output would result. Such higher torque output is represented by line segment "b" shown in FIG. 2. The shaded area bordered by line segments "a" and "b" is characterized for its high propensity for the emission of smoke by the diesel engine and accordingly represents an operating regime to be avoided.

Another line segment on the full-load torque output line shown in FIG. 2 is that segment which represents peak torque ($T_p$) at the apex of the curve. In selecting the optimum turbocharger for a diesel engine 10, diesel engine combustion and control engineers try to maintain an air-to-fuel ratio (A/F) at $T_p$ above 25:1. As an A/F ratio above 25:1 limits the smoke emitted by the diesel engine to a minimum, the same principle extends to both sides of point $T_p$ and generally covers a segment at the apex of the torque curve that is shown in FIG. 2 by line segment "c."

At rated engine speed and wide-open throttle conditions, a torque output $T_{RS}$ is produced. In general, the A/F ratio at $T_{RS}$ is about 30:1. This A/F ratio is once again designed to minimize the emission of smoke, while still providing good power output at the point of the most efficient fuel consumption. Following $T_{RS}$, at increased engine speed the torque output drops off rapidly until it becomes zero as shown by the intersection of the torque output line with the x-axis. Elimination of the rapid drop off in torque output is normally controlled by a high speed governor. A high speed governor reduces the flow of fuel into the engine in proportion to the increase in the speed or rpm of the engine.

Throughout engine operation near or at full load, the potential for the emission of smoke is rather high. The physical and chemical characteristics of the smoke emitted by the engine may change from line segment "a" to line segment "b" and from point $T_p$ to $T_{RS}$. However, the smoke emitted by a diesel engine at or near full load consists mostly of carbonaceous particulate matter. (PM)

Figure 3:
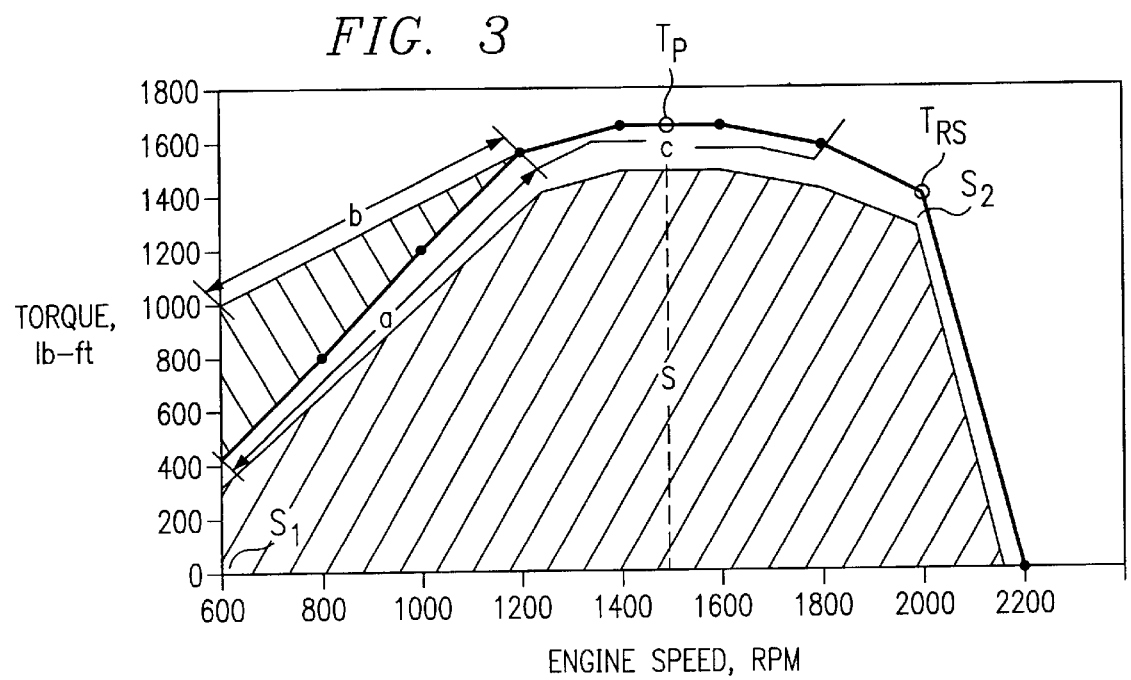
FIG. 3 is a graph similar to that shown in FIG. 2 of the torque output from a direct injection diesel engine but under partial load conditions.

A continued examination of the torque-speed (T-N) relationship in other engine operating regimes is also instructive. For instance, the shaded area indicated by S in FIG. 3 is an area where the engine operates at a rather high A/F ratio. Point S, (low idle speed and no load) may have an A/F ratio in excess of 150:1 and Point $S_2$ represents an operating condition having an A/F ratio of 40–50:1. When operating at light load, more unburned lube oil is entrained from the cylinder walls past the piston rings to the combustion chamber, and then from the combustion chamber into the exhaust system. This entraining of unburned lube oil occurs because of irregular piston ring sealing at low combustion pressures. Irregular piston ring sealing contributes to a marked increase in the soluble organic fraction (SOF) of particulate matter (PM).

On the other hand, nitrogen oxide ($NO_x$) is usually the product of a high combustion temperature and a high residence time of the combustion process in a high temperature combustion chamber. This high temperature combustion is generally a function of several parameters such as:

a. The premixed portion of fuel during ignition delay
b. The fuel rate (generally proportional to engine load)
c. Engine speed
d. Intake manifold temperature
e. Fuel cetane number and general quality
f. Fuel injection timing.

Figure 4:
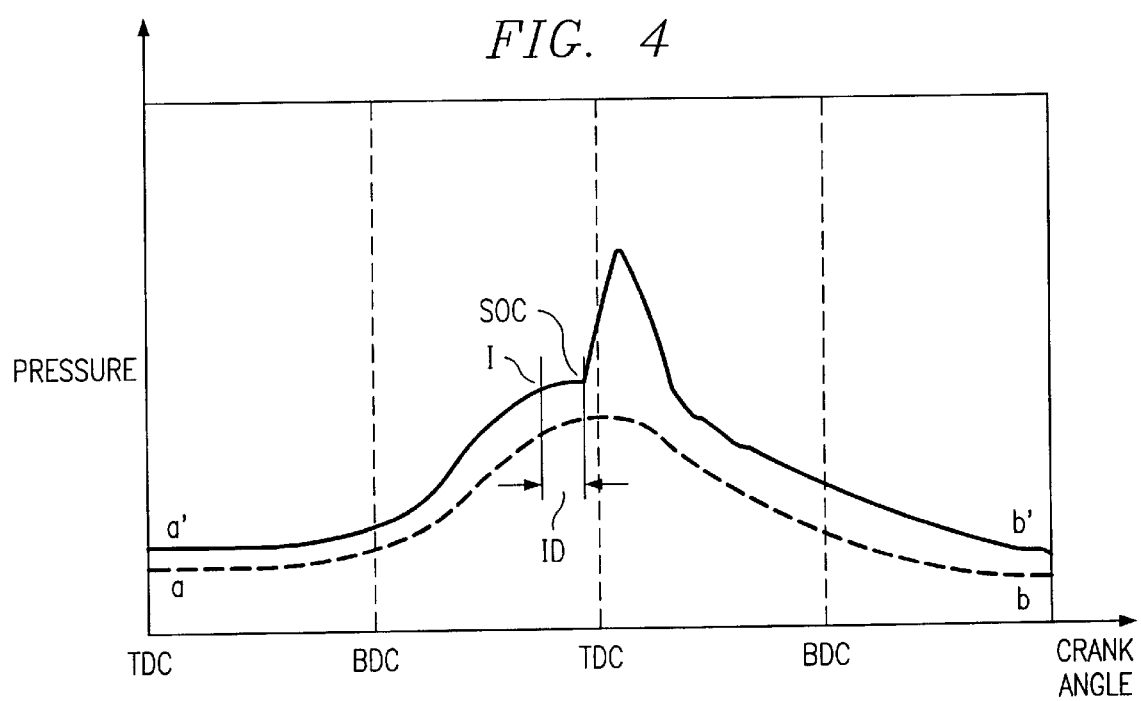
FIG. 4 is a pressure-crank angle diagram with compression and combustion traces during an engine cycle.
Figure 5:
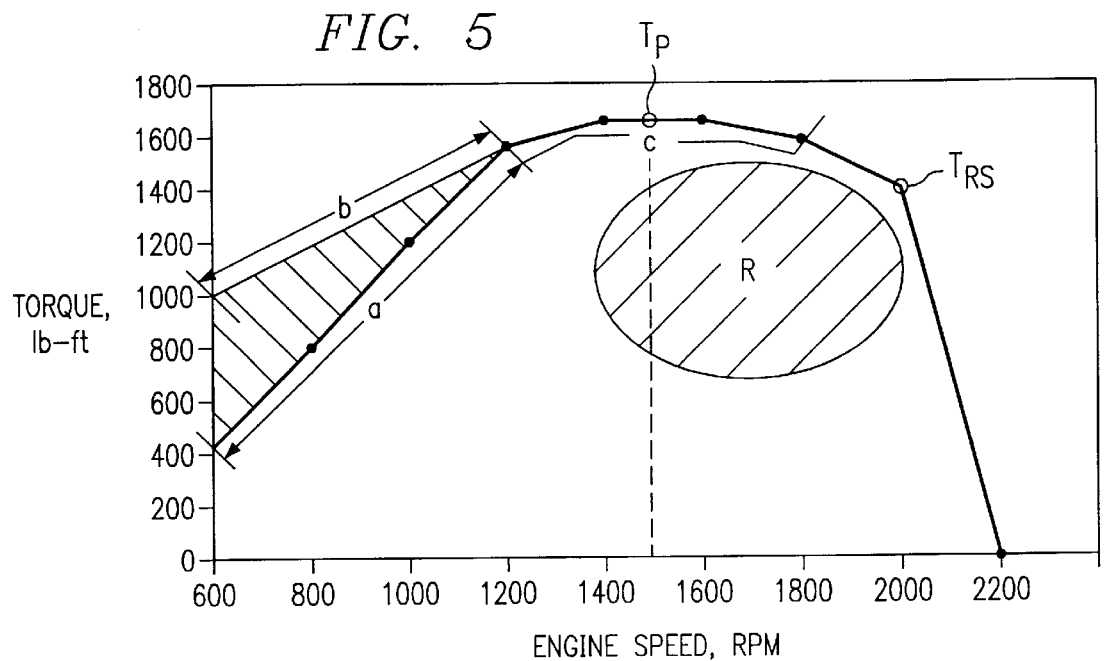
FIG. 5 is a graph, similar to that shown in FIG. 2, of the full-load torque output from a direct injection diesel engine with the region of high $NO_x$ emission highlighted.

As these various operational parameters of a diesel engine are considered, it is possible to consider scenarios for their interaction and how that interaction might affect the NO. emissions from the engine. For example, in FIG. 4 the lower dashed line (a–b) indicates the pressure-crank angle trace during a compression-only cycle (without fuel injection or combustion). The upper solid line a'–b' is a slightly vertically offset trace (for clarity) of a combustion cycle resulting from fuel being injected into the combustion chamber at Point 1. Following the injection of the fuel into the combustion chamber, the rate of pressure rise slows down as the injected fuel absorbs heat from the surrounding compressed air in the combustion chamber. This absorbed heat is used in the combustion chamber to help evaporate the injected fuel. The evaporated fuel is then mixed with the surrounding air, which mixture is assisted by the swirling motion in the air flow induced by special intake port design. The time between the start of injection (I) and the start of combustion (SOC) is known as ignition delay (ID). The longer the ignition delay the larger the premixed portion of the fuel. In most cases, as the premixed portion of the fuel reaches stoichiometric conditions (A/F ratio of 14.7:1) and is exposed to the auto-ignition temperature of the fuel, the combustion process is started. Stoichiometric mixtures burn with great intensity, which burning intensity leads to high rates of temperature increase, high combustion pressures, as well as high combustion temperatures. This combustion process contributes greatly to high $NO_x$ emissions from the diesel engine. For this reason, diesel engine combustion and control engineers seek to shorten the ID to reduce the premixed portion of the fuel and thereby reduce the peak combustion pressures and temperatures, thus limiting $NO_x$ emissions. Likewise, other interactions are common between the other high temperature combustion parameters that can also lead to high $NO_x$ emissions. The net outcome of all these interactions leads to an operating condition shown by area (R) in FIG. 5. Engine operation in area (R) is known for its high $NO_x$ emissions. This does not mean that the rest of the operating regime is $NO_x$-free, only that area (R) is usually characterized by high $NO_x$ emissions.

Having identified the various diesel engine operating regimes, technical solutions specific to each pollutant in the emissions from a diesel engine must be developed. Once this task is accomplished, these pollutant-specific technical solutions must then be integrated in the most effective way to achieve the lowest possible emissions in the most commercially-viable way.

Potential Emission Diesel Engine Reduction Technologies Considered

Many of the available emission reduction technologies have been used in other types of internal combustion engines. The utilization of these prior art emission reduction technologies in an integrated system heavy-duty diesel engines is new and meets the challenge posed by the new more restrictive diesel engine emission regulations. The list of emission reduction technologies below includes those technologies that have shown potential for use with commercial diesel engines.

A. Exhaust Gas Recirculation (EGR)

Exhaust gas recirculation has been used in both gasoline and light-duty diesel engines for a number of years. The need for EGR in DI heavy-duty diesel engines did not materialize until the proposed emission standards for the year 2004 were published. These 2004 proposed emission standards called for $NO_x$+NMHC of 2.5 g/bhp-hr. With EGR this new level for $NO_x$+NMHC was obtained. But along with the reduction of $NO_x$+NMHC came an increase in the emission of particulate matter (PM) from the engine. In essence, EGR has two effects on combustion in diesel engines.

These effects are:
1. Dilution of the charge air where the oxygen in the charge air is replaced with exhaust. Thus the combustion occurring in the combustion chamber over the piston is deprived a fraction of the oxygen that is displaced by the recirculated exhaust gas.
2. Acting as heat sink for the combustion process, thus preventing the development of high combustion temperature and limiting $NO_x$ formation. Cooling EGR is viewed as means of enhancing its head-absorbing capacity, because the difference between peak combustion temperature and EGR temperature increases as shown in the equation shown below.

Absorbed heat $Q^0$=EGR rate (m°)×EGR specific heat at constant pressure $(C_p)$×$(T_{comb}-T_{EGR})$ Since EGR dilutes or (displaces) some of the oxygen in the charge air entering the combustion chamber, its use for $NO_x$ reduction is encouraged in areas where A/F ratios are rather high. This regime is shown in FIG. 3 where it is generally represented by the Area S. In principle, it is not desirable to use EGR near or at full-load conditions where A/F ratios decrease and approach values below 25:1. A/F ratios below 25:1 are conducive to high smoke formation. Even by limiting EGR to part-load conditions (Area S in FIG. 3), there is a tendency to increase the carbonaceous content of particulate matter (PM) to a point where special action, such as after treatment, must be taken to comply with the emission standards for PM.

Figure 6:
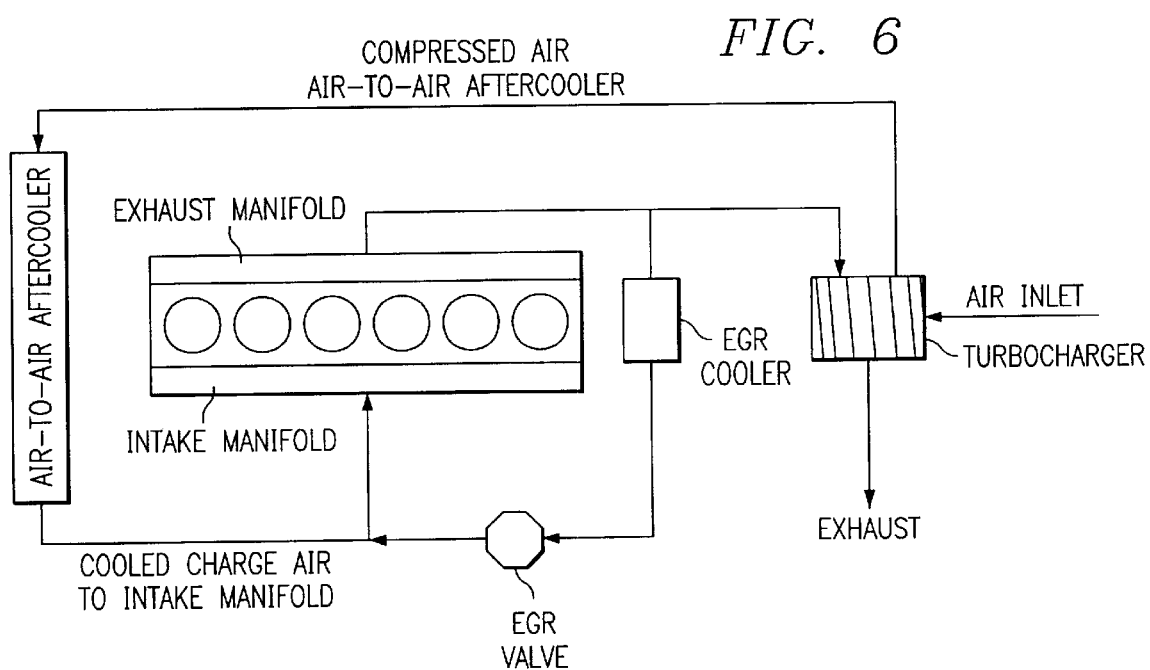
FIG. 6 is a schematic diagram of a cooled EGR system.

In summary, cooled EGR (see FIG. 6) is considered an effective $NO_x$ reduction method for part-load conditions if adequate measures are taken to limit any excess carbonaceous PM in the emissions from the diesel engine. However, still other NO, reduction technologies must be considered when operating a diesel engine near or at full-load.

B. Selective Catalytic Reduction (SCR) of $NO_x$

Figure 7:
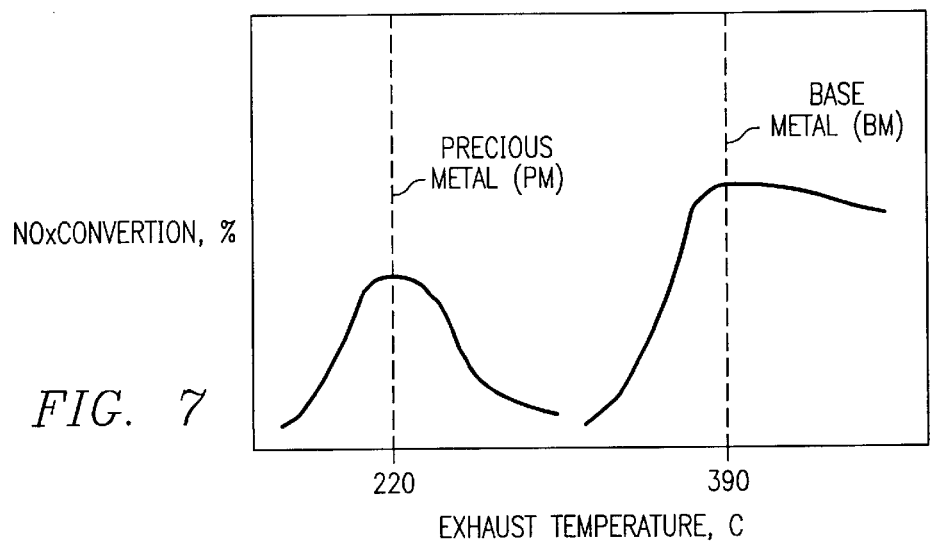
FIG. 7 is a graph showing the effect of SCR on $NO_x$ with supplemental HC for two catalytic formulations.

Selective catalytic after treatment of $NO_x$ requires the use of an external reducing agent such as a hydrocarbon, ammonia, or urea. About 90 percent of the nitrogen oxide in diesel exhaust is NO with the other 10 percent mostly $NO_2$. Therefore, SCR of $NO_x$ emitted from diesel engines is aimed mainly at reducing NO. In cases where a supplemental hydrocarbon is used as reductant, modest NO reductions are experienced within a very narrow exhaust temperature range. This exhaust temperature range depends on the type of catalyst used. For exhaust temperatures of about 220° C., precious metal based formulations are preferred as reductants. Formulations using base metals are better suited for exhaust temperatures of about 390° C. (see FIG. 7). The desire to develop these SCR systems is driven by their potential simplicity if onboard diesel fuel is used as the supplemental hydrocarbon. Unfortunately, these SCR systems require hydrocarbon/NO ratios of about 6:1 for very modest NO reduction and are applicable only to very narrow exhaust temperature windows. This requirement for SCR is not in line with the diesel engine's fuel-efficient philosophy. In addition, such hydrocarbon/NO ratios usually lead to measurable increases in the emission of PM.

On the other hand, the SCR of NO, using ammonia or urea as reducing agents has provided much better results than its supplemental hydrocarbon counterpart. Chemical reactions regulating $NO_x$ reduction via $NH_3$ are described below.

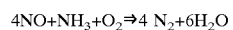

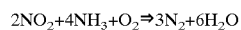

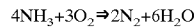

Likewise, the chemical reaction with a urea $[CO(NH_2)_2]$ solution is described below:

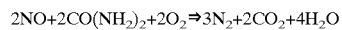

SCR systems using a 32.5 percent urea solution concentration have been used in mobile fleets equipped with direct injection diesel engines. A typical $NO_x$ reduction of 70 percent has been reported when these direct injection diesel engines are tested over the EPA FTP for heavy-duty applications. Some reports have indicated over 70 percent $NO_x$ reduction in steady-state conditions without exceeding 10 parts per million (ppm) ammonia slip (defined as unreacted ammonia measured downstream of the catalyst).

For use in diesel engine exhaust systems, a temperature range of 260–450° C. is considered. Vanadium/titanium catalyst formations have proven to be most effective in this temperature range. For this reason, experimentation with SCR systems for $NO_x$ in direct injection diesel engines typically uses some type of vanadium/titanium catalyst.

C. Diesel particulate filters (DPF)

Diesel particulate filters perform two functions in the after-treatment of exhaust gases:
1. particulate matter (PM) collection
2. particulate matter (PM) disposal Three methods are typically used for particulate matter (PM) collection. These methods are: impaction, interception, and diffusion. Diffusion is the most efficient method and therefore is the most commonly used for PM collection. The PM collection process in DPFs is efficient and trouble-free. However, particulate matter (PM) disposal is more challenging and involves several concepts. These concepts can be identified under two general categories: active or passive disposal (regeneration). If outside heat (other than that of the exhaust gas) is added to effect regeneration, the PM disposal system is active. If no outside heat is added, then the PM disposal system is passive.

Some passive DPF systems use a precious metal coating on the surfaces of the DPF to lower the temperature at which regeneration takes place. This method may allow quasi-continuous or self regeneration and usually reduces both HC and CO.

The System for the Integration of Emission Reduction Technologies

An integrated system including cooled exhaust gas recirculation (EGR), selective catalytic reduction (SCR) using urea solution as reductant, and a diesel particulate filter (DPF) is the subject of the present invention. As explained below, the EGR loop is between the exhaust manifold and the intake manifold, and cools and valves exhaust gas. The valving is achieved with a double orifice valve whose operation depends on full versus light load conditions.

Cooled exhaust gas recirculation (EGR) is used in engine operating regimes where A/F ratios are above 25:1. The use of cooled exhaust gas recirculation (EGR) limits smoke formation and the uncontrolled increase in carbonaceous particulate emission.

Figure 8:
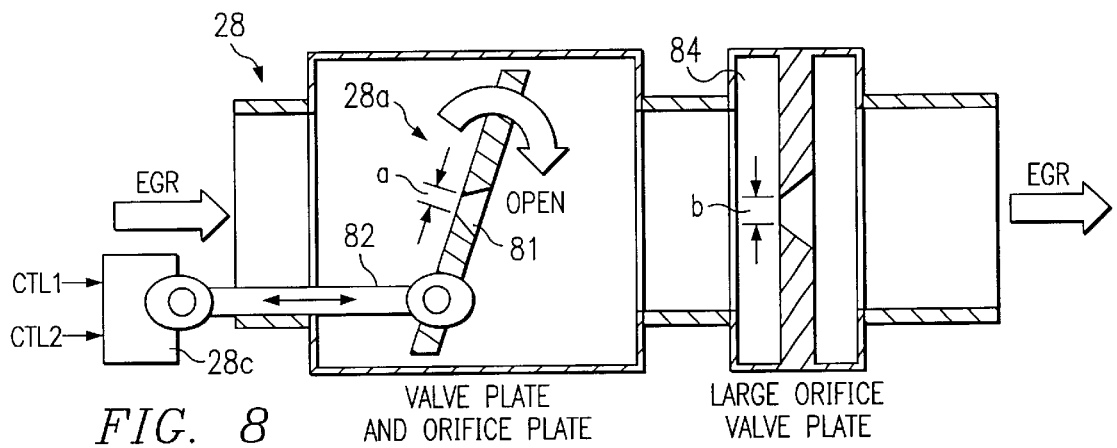
FIG. 8 illustrates an example of a double orifice valve, such as could be used for the engine of FIG. 1.

As illustrated in FIG. 8, the implementation of a cooled exhaust gas recirculation (EGR) system with a diesel engine uses a simple EGR valve 28 consisting of two orifices in series, a and b. The EGR valve 28 graduates the EGR rate according to engine load as indicated by an intake manifold pressure signal, CTL. The intake manifold pressure signal is usually generated by a manifold absolute pressure (MAP) sensor 102a. A small orifice ("a" diameter) in the small orifice plate 81 accommodates high-load requirements, while a large orifice ("b" diameter) in the large orifice plate 84 accommodates light engine loads.

With the first stage of valve 28 moved to the open position, EGR flow will be controlled by the large orifice "b." The flow area of orifice "b" is designed to control EGR rate for light-load engine operating conditions. As the load on the diesel engine increases, a threshold level of manifold absolute pressure (MAP) is reached in the intake manifold. This threshold manifold absolute pressure (MAP) triggers a signal that causes the first stage 28a of EGR valve 28 to close through the activation of an actuator such as a stepper motor 28c, a solenoid/air cylinder mechanism, or a system well known to those of ordinary skill in the art. With the first stage 28a closed, small orifice "a" intercepts the EGR flow. Orifice "a" then becomes the smallest diameter restriction in the EGR path through the closed valve 28. The size of orifice "a" is designed to control EGR flow rate to meet the high-load and full-load NO, reduction requirements.

The EGR valve 28 shown in FIG. 8 is also designed to receive a signal CTL2 representing acceleration conditions from the pedal position sensor or throttle position sensor. This signal results in valve 28 moving to a closed position when certain accelerating conditions are detected. For example, this closing action may be initiated when the throttle position changes abruptly. The EGR valve 28 remains closed for a predetermined time (a few milliseconds) to avoid the usual emission of smoke taking place during turbocharger lag in hard acceleration. Thus, two control signals, CTL1 (intake pressure) and CTL2 (engine speed) may be used to control the operation of valve 28.

As engine load increases, the pressure differential between the exhaust and intake manifolds is reduced to a minimum, thus reducing EGR flow to nothing. At this point the SCR system 36 is energized through urea solution injection to perform the chemical reaction described below:

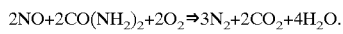

$$2NO+2CO(NH_2)_2+2O_2 \Rightarrow 3N_2+2CO_2+4H_2O.$$

Figure 9:
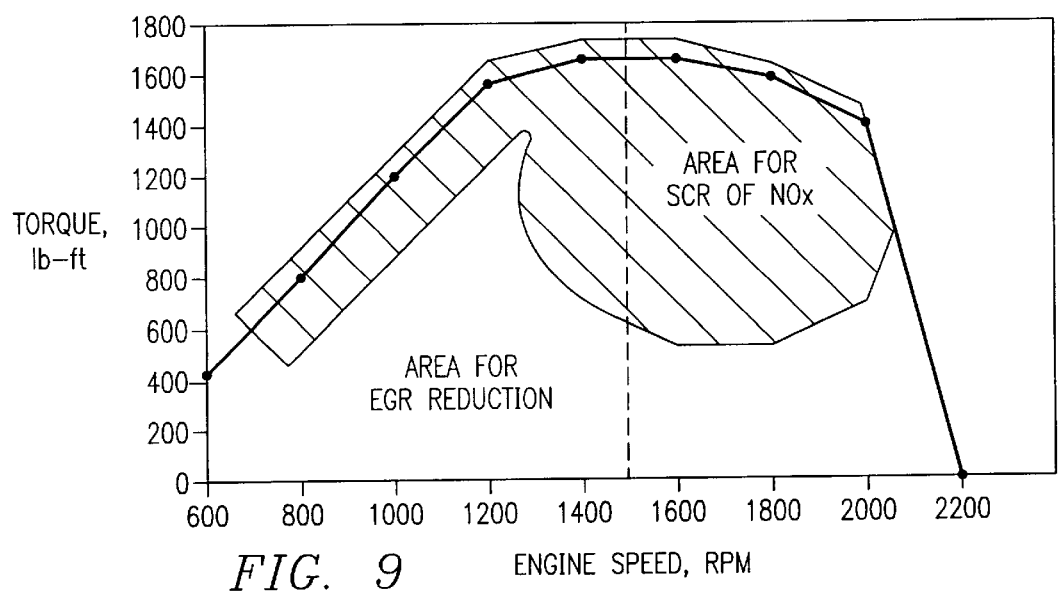
FIG. 9 is a graph, similar to that of FIG. 2, showing the areas for the reduction of emissions in a diesel engine provided by the integrated system of the present invention.

Normally, detailed $NO_x$ rate mapping as a function of engine speed and load is conducted. Based on this map, urea injection is scheduled in proportion to $NO_x$ emission to achieve a target reduction within a targeted ammonia slip ceiling. The area where SCR of $NO_x$ is most effective is shown in FIG. 9.

Finally, if needed, a diffusion-type wallflow construction Diesel Particulate Filter (DPF) 40 with a catalytic coating carefully designed to assist the regeneration of carbon can be used downstream of the SCR. The catalytic coating on the DPF 40 is a precious metal with a loading designed to avoid sulfate formation, especially when exposed to high exhaust temperatures. It is customary to expect that use of EGR leads to increasing exhaust temperatures. Another benefit for the catalytic coating on the surface of the ceramic cordierite filter material is reducing ammonia slip.

The complete disclosed integrated system for the reduction of $NO_x$/PM released by diesel engines into the atmosphere is shown in FIG. 1.

Operation

A still better understanding of the operation of the integrated system for reducing the $NO_x$ and PM emissions from diesel internal combustion engines 100 may be had from a review schematic diagram of the system 10 shown in FIG. 1.

Beginning at the air inlet 12, atmospheric air is drawn into the diesel engine 100 through the turbocharger 106. The atmospheric air is compressed in the turbocharger 106 and flows through compressed air line 14 to an air-to-air after cooler 16. The cooled, compressed air is then conducted from the air-to-air after cooler 16 to the intake manifold 102 on the diesel engine 100 through cooled air line 18.

Following the mixing of the cooled, compressed air with the evaporated fuel in the combustion chambers at the top of the cylinders in the diesel engine 100, combustion occurs as the mixture is compressed by the movement of the pistons in the cylinders. The exhaust gases produced from the burning of the evaporated fuel in each combustion chamber are gathered in the exhaust manifold 104 and conducted away from the diesel engine 100 in parallel flow through lines 20 and 22. The kinetic energy of that portion of the moving exhaust gas passing through line 20 is used to turn the turbocharger 106. The remainder of the exhaust gases are transported through line 22 to an Exhaust Gas Recirculation (EGR) cooler 24. The cooled exhaust gases passing through EGR cooler 24 are then conducted through line 26 to an exhaust gas recirculation (EGR) valve 28. The EGR valve 28 has been described above by reference to FIG. 8. It will be understood that other types of EGR valves may be used.

The exhaust gases passing through the EGR valve 28 pass through line 30 into intake manifold 102. This recirculation of the exhaust gases back through the combustion chambers of the diesel engine 100 causes further consumption of the combustible matter contained in the exhaust gases.

Exhaust gases exiting the turbocharger 106 pass in series flow through line 32 to a process for the selective catalytic reduction (SCR) of $NO_x$. This is accomplished by injecting a reductant agent 34 such as urea into the exhaust gases and assuring contact of the reducing agent with the exhaust gases for reducing the $NO_x$ in the exhaust gases.

Downstream from the SCR system 36 the exhaust gases are conducted through line 38 to a passive or active catalyzed diesel particulate filter (DPF) 40. Any remaining exhaust gases are released through line 42 into the atmosphere.

There is thereby provided by the integrated system 10 of the present invention a device and a method for reducing both the nitrogen oxide (NO,) and particulate matter (PM) in the emissions from diesel internal combustion engines released into the atmosphere.

While the foregoing invention has been described in terms of its preferred embodiments, it will be understood by those of ordinary skill in the art that other systems incorporating the principles of the disclosed invention may be constructed. Such other systems shall be included within the scope and meaning of the appended claims.

What is claimed is:

1. An integrated system for treating exhaust gas emissions from an engine, said system comprising:
   an exhaust gas recirculation system for inserting a portion of the exhaust gas flow into the flow of intake air into the engine, wherein the exhaust gas recirculation system has a recirculation flow line, and wherein the flow line has a first orifice and a second orifice, each orifice operable to restrict flow of exhaust through the flow line;
   wherein the first orifice is upstream of the second orifice, smaller than the second orifice, and configurable from open to closed;
   a selective catalytic reduction system placed in the exhaust gas flow downstream of the engine in parallel to said exhaust gas recirculation system; and
   a particulate filter placed in the exhaust gas flow downstream and in series with said selective catalytic reduction system.

2. The integrated system as defined in claim 1 wherein the reductant used in said selective catalytic reduction system is selected from a group including urea, a hydrocarbon, and ammonia.

3. The integrated system as defined in claim 1 wherein said particulate filter is a passive filter.

4. The integrated system as defined in claim 3 wherein said passive particulate filter includes a precious metal catalytic coating.

5. The integrated system as defined in claim 1 further including an intake air cooler upstream from the intake manifold of the engine.

6. The integrated system of claim 1, wherein the first orifice and the second orifice are housed in a single valve housing installed in the flow line.

7. The integrated system of claim 1, wherein the first orifice is configurable in response to at least one control signal.

8. The integrated system of claim 1, wherein the first orifice is configurable in response to a control signal representing engine intake pressure.

9. The integrated system of claim 1, wherein the first orifice is configurable in response to a control signal representing engine speed.

10. The integrated system of claim 1, wherein the first orifice is an orifice in a plate, and wherein the first orifice is configurable by positioning the plate.

11. A method for reducing emissions from engine exhaust flow, comprising the steps of:
    recirculating a portion of the exhaust gas flow into the flow of air drawn into the engine, using a recirculation flow line;
    using a first orifice to control the amount of flow in the flow line, by receiving a control signal, such that the first orifice is open or closed in response to the control signal;
    using a second orifice to control the amount of flow in the flow line downstream of the first orifice;
    wherein the first orifice is smaller than the second oriface.

12. The method as defined in claim 11 further including the step of regulating the flow of exhaust gas flow into the flow of air drawn into the engine.

13. The method as defined in claim 12 wherein said regulation of the flow of exhaust gas flow is controlled by a manifold absolute pressure sensor on the air intake side of the engine.

14. The method of claim 11, further comprising the step of conducting the exhaust gas flow into a selective catalytic reduction system.

15. The method as defined in claim 14 wherein said selective catalytic reduction system further includes a flow of a reductant selected from a group including urea, a hydrocarbon, and ammonia.

16. The method of claim 11, further comprising the step of conducting that exhaust gas flow passing through said selective catalytic reduction system through a passive particulate filter.

17. The method as defined in claim 16 wherein said passive particulate filter includes a precious metal catalytic coating.

18. The method of claim 11, wherein the first orifice and the second orifice are housed in a single valve housing installed in the flow line.

19. An integrated system for treating exhaust gas emissions from an engine, said system comprising:
    an exhaust gas recirculation system for inserting a portion of the exhaust gas flow into the flow of intake air into the engine;
    wherein the exhaust gas recirculation system has a recirculation flow line, and wherein the flow line has a first orifice and a second orifice, each orifice operable to restrict flow of exhaust through the flow line; and
    wherein the first orifice is upstream of the second orifice, smaller than the second orifice, and configurable from open to closed.

* * * * *